United States Patent Office 3,214,698
Patented Oct. 26, 1965

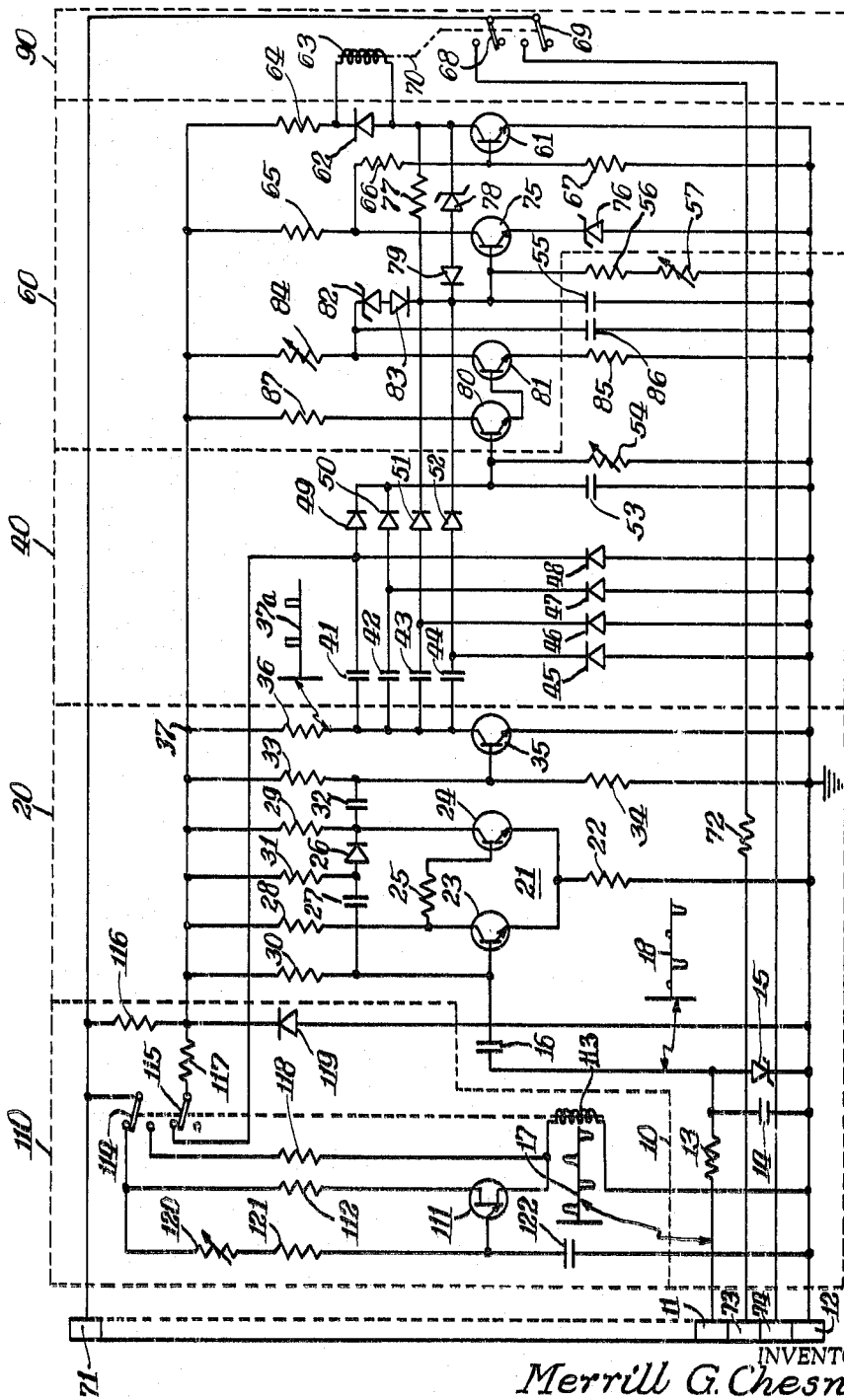

3,214,698
FREQUENCY DETECTING CONTROL CIRCUIT
Merrill G. Chesnut, Broomfield, Colo., assignor to
Sundstrand Corporation, a corporation of Illinois
Filed Aug. 15, 1962, Ser. No. 217,016
15 Claims. (Cl. 328—136)

This invention relates to a control circuit and, more specifically, to a frequency sensitive circuit for controlling over-speed and under-speed conditions of a prime mover.

Prime movers may be broken down into two general types, those designed to operate with varying speed characteristics, and those which perform at a substantially constant speed with an output torque which varies depending upon the load placed on the prime mover.

The substantially constant speed prime mover is usually designed to operate at its most efficient speed, and variations of speed usually indicate either overload conditions or other problems present which may cause serious damage to the device. In the past, many speed control systems have been developed which attempt to protect the prime mover under such operating conditions and which have had varying degrees of success.

It is an object of this invention to provide an improved control circuit for a constant speed prime mover.

It is a further object of this invention to provide an improved speed control circuit wherein response is obtained with small variations in speed of a prime mover.

It is one feature of this invention to provide a prime mover control circuit responsive to receive signals of varying frequencies comprising means for receiving the signal and for generating pulses of predetermined time duration and magnitude in response to the receipt of signals, means, coupled to the receiving and generating means, for adding pulses to develop a control signal having a amplitude proportional to the frequency of received signals, and means coupled to receive the control signal for performing a control function when the received signal has a predetermined frequency.

It is a further feature of this invention to provide a time-delay circuit in such a control circuit to allow a controlled prime mover to come up to speed.

It is a further feature of this invention to provide both over-speed and under-speed control circuits for a prime mover.

Further objects and advantages will become apparent from the following detailed description taken in connection with the accompanying drawing which shows one embodiment of the invention.

Refer now to the drawing which is divided into its major components by dashed lines, and in which there is incorporated an input circuit 10 coupled to a wave-shaping circuit 20. The output of the wave-shaping circuit is connected to a frequency detecting circuit 40 having its output connected to a control circuit 60 for controlling the current flow through a controlled member 90. There is provided, in addition, a time-delay circuit 110.

The operation is generally as follows. The input circuit 10 receives a signal composed of a series of alternately positively and negatively going pulses which are clipped and allows only the negative pulses, clamped to a predetermined maximum value, as an output. The frequency of pulses is proportional to the speed of a prime mover. The wave-shaping network 20 includes a monostable multivibrator which produces square wave pulses having the same frequency as the negative going pulses of the input signal which are fed to the frequency detecting network 40. The detecting circuit counts the pulses and, upon the recepit of a pulse rate which is either above or below a predetermined number per second, actuates the control circuit 60 to prevent current flow through the controlled member 90 which, in turn, removes the potential from the prime mover which is being regulated. A time-delay circuit 110 allows for "speed-up" of the prime mover to an operating speed.

A prime mover to be controlled, which is not shown, has a means incorporated therein for generating a signal which has a frequency proportional to the speed of the prime mover. For example, a magnetic pickup may be coupled to the shaft of the prime mover which develops a signal having a predetermined number of pulses per revolution. This signal is coupled to a pair of input terminals 11, 12 in the input circuit 10. A series parallel circuit consisting of a resistor 13, a capacitor 14, and a diode 15 is connected between the terminals 11, 12. A coupling capacitor 16 is provided for supplying a signal to the wave-shaping network 20. The incoming signal from the prime mover frequency-sensitive device has a shape shown generally by the graph 17 and includes both positive and negative pulses. When a positive pulse is received, diode 15 is forwardly biased and substantially no portion of the received signal appears as an input to the wave-shaping network 20. When negative pulses are received, diode 15 acts as an extremely high resistance and a signal having the wave shape shown by a graph 18 is developed as an output of the input circuit. Diode 15 is of the Zener diode type and when a signal is received which has a potential greater than the design characteristics of the diode, it will conduct in a reverse direction thus providing a clamping action which limits the magnitude of the negative pulse coupled to wave-shaping network 20.

The wave-shaping network 20 includes a monostable multivibrator 21 including a common emitter resistor 22, a pair of NPN transistors 23, 24, a resistor 25 coupled between the collector of transistor 23 and the base of transistor 24, and a feedback and decoupling network consisting of a diode 26 in series with a capacitor 27 coupled between the collector of transistor 24 and the base of transistor 23. A pair of load resistors 28, 29 are provided for transistors 23 and 24, respectively, and a pair of resistors 30, 31 complete the circuit providing the proper biasing conditions for the monostable multivibrator 21.

A power amplifier in network 20 includes a coupling capacitor 32, a pair of series connected biasing resistors 33, 34 having their common point joined to the base of a transistor 35. The emitter of the transistor 35 is connected to a point of reference potential, in this case ground, which is also coupled to the input terminal 12. The collector of transistor 35 is connected through a load resistor 36 to a point of positive potential 37.

Throughout the discussion of the circuitry in the disclosed embodiment NPN transistors have been shown. It is to be understood with the proper attention being paid to the biasing conditions of the transistors, PNP devices may be substituted therefor.

The negative going pulses from input circuit 10 coupled through capacitor 16 are supplied to the base of transistor 23 of the multivibrator which, in absence of a received signal, is in a normally conducting condition with a low voltage appearing at collector. The load current flowing through resistor 22 places the emitter of transistor 23 at some point positive with respect to ground. When the negative signals are received at the base of transistor 23, it is effectively biased below cut-off and the collector potential rises to substantially B plus voltage. This voltage is coupled through resistor 25 to the base of transistor 24 biasing it in a forward direction and causing it to conduct. The voltage drop across resistor 29 increases and drives the common point between capacitor 32 and diode 26 in a negative direction causing diode 26 to conduct. Capacitor 27 couples this negatively going signal to the base of transistor 23 further biasing it in the "off" condition. The time constant of the charging circuit for capacitor 27 determines the pulse width of the multivibrator, and after it charges to a predetermined point, the base of transistor 23 goes positive with respect to the emitter and it begins to conduct. The collector goes negatively with respect to the positive potential of the source, and transistor 24 is cut off by this signal. These conditions are maintained until such time as another negative going pulse is received from the input circuit. Thus, for each input pulse, a square wave signal of given amplitude and time duration is developed.

Resistors 33, 34 connected between ground and the positive supply potential provide a bias network for transistor 35 maintaining it in the "on" condition in absence of a received negative going pulse generated by the multivibrator. Capacitor 32 couples such negative pulses to the base of transistor 35 causing it to cut off, or cease to conduct. Current ceases to flow through resistor 36, and the common point between the collector of transistor 35 and resistor 36 goes in a positive direction. The signal appearing at this point is shown at graph 37a.

The frequency-detecting circuit includes four capacitors 41, 42, 43, and 44 connected to the collector of transistor 35 and also connected to four diodes 45, 46, 47, and 48. Additional diodes 49, 50, 51, and 52 are connected, respectively, to the capacitors 41–44. The cathodes of diodes 49 and 50 are joined together and connected through a storage capacitor 53, shunted by a variable resistance 54, to ground. Diodes 51 and 52 have their cathodes coupled through a second storage capacitor 55, shunted by a fixed resistor 55 and a variable resistor 57 in series to ground.

If a positively going signal is developed at the collector of transistor 35, the capacitors 41, 42, 43, and 44 charge to a predetermined value through the storage capacitors 53, 55 and the diodes 49, 50, 51, and 52. When transistor 35 conducts, the load current flowing through resistor 36 causes the potential at the collector of transistor 35 to drop and the capacitors 41 through 44 discharge through the shunt circuits provided by diodes 45 through 48. The time constants of the capacitor circuits are such that the capacitors fully charge during the time of the positive signals generated by the wave-shaping circuit. Storage capacitors 53, 55 charge during the receipt of the positive pulse from the wave-shaping network and discharge in absence of positive pulses through the respective shunt resistors 54, 56 and 57.

Control circuit 60 includes a transistor 61 which normally conducts when the controlled prime mover is operating at the desired speed. The collector circuit of transistor 61 includes a diode 62 in parallel with the coil of a relay 63 and in series with a load resistor 64 connected to the positive potential. The emitter of transistor 61 is connected to ground and the base is connected to a series biasing circuit including a resistor 65, a resistor 66, and a resistor 67 whose values have been selected to bias the base of the transistor so that it conducts at normal the desired operating speed of the prime mover. Under these conditions, the relay 63 is actuated and switch arms 68 and 69, joined by the dashed line 70 to relay 63, are in the upper position supplying positive potential from a terminal 71 through the switch arm 68 and resistor 72 to terminal 73 and through switch arm 69 to terminal 74. Relay 63 may, for example, control an energizing circuit for the fuel valve of the prime mover.

Over-speed control of the motor is provided by a transistor 75 having its collector coupled to the junction point between resistors 65 and 66 and having its emitter coupled through a diode 76, in this case a Zener diode, to ground. The base of transistor 75 is connected to the storage capacitor 55 of the frequency-detecting circuit. A positive feedback circuit is provided by a resistor 77 connected between the collector of transistor 61 and the base of transistor 75, and, in addition, a latching circuit is provided in parallel with the feedback circuit and includes a pair of back-to-back diodes 78, 79.

Since a positive pulse is generated by the wave-shaping network each time a negative pulse is received from a frequency-sensitive pickup on the prime mover, the number of pulses stored on capacitor 55 is dependent upon the frequency of revolution of the prime mover. Under normal speed conditions, not enough pulses are stored to cause the base of transistor 75 to be positive with respect to the emitter and the transistor remains in the "off" condition. However, should the prime mover speed up for any reason beyond a predetermined upper speed, the base of transistor 75 goes positive with respect to the emitter and it begins to conduct. Since the load current for transistor 75 flows through resistor 65 in the bias circuit for transistor 61, the potential on the base of transistor 61 decreases to a point where transistor 61 is biased in the "off" condition. Thus, current flow through coil 63 is prevented and the relay drops out and opens switch arms 68 and 69 removing potential from the energizing circuit of the prime mover. As the collector of transistor 61 begins to go positive, a positive signal is coupled back to the base of transistor 75 by resistor 77 and transistor 75 is rapidly switched to the "on" condition, thus insuring proper operation of the circuit. When the voltage at the collector of transistor 61 is sufficient to cause breakdown of Zener diode 78, current is supplied to the base of transistor 75 to maintain latching even though no signal is provided by the frequency-detecting circuit.

Under-speed protection for the rotating device is provided by a pair of transistors 80, 81. A pair of diodes 82, 83 of the Zener type are connected "back-to-back" between the collector of transistor 81 and the base of transistor 75. In addition, transistor 81 has its collector connected through a resistor 84 to the source of positive potential and its emitter connected through a resistor 85 to ground potential. A capacitor 86 is connected between the collector of transistor 81 and ground. Transistor 80 has its collector connected to positive potential through a resistor 87, its emitter being coupled to the base of transistor 81, and its base being connected to the storage capacitor 53.

The transistors 80 and 81 are operated in a ganged mode, and when the average direct current potential at the base of transistor 80 drops below a predetermined level, due to the prime mover operating at a below-than-desired speed, transistor 81 is cut off and the collector potential rises to substantially the supply potential. Under these conditions, Zener diode 82 breaks down and a positive signal is supplied to transistor 75 causing it to conduct and to shut off transistor 61 thus opening relay 63.

Variable resistor 57 varies the operating characteristics of the circuit so that it may be adjusted to remove power from the prime mover when a given over-speed condition exists and the control of under-speed circuit actuation is accomplished by resistors 54 and 84.

The time-delay circuit 110 is provided to allow the prime mover to come up to speed before energizing the control circuit. It includes a series circuit having a resistor 112, a unijunction transistor 111, and the coil of a relay 113 connected between ground and a source of positive potential. The relay 113 controls a pair of switch arms 114 and 115 having a position when the coil is not energized as shown in the figure. A voltage-dropping resistor 116 is provided between the input terminal 71 and the various load resistors for the previously discussed transistors. A diode 119 is connected between resistor 116 and ground and a resistor 117 is coupled between the common point of resistor 116 and diode 119 and switch arm 115. The common point between capacitor 41 and diode 49 is joined to the upper contact mating with switch arm 115. A latching resistor 118 is provided for energizing coil 113 when switch arm 114 is in its lower position. A variable resistor 120 and a fixed resistor 121 are in series with a capacitor 122 to provide the triggering circuit for transistor 111. The time constant of the time-delay circuit including resistors 120, 121 and capacitor 122 is such that several seconds elapse between the energizing of the circuit and charging of capacitor 122 to a potential which causes transistor 111 to conduct or "turn on." When this occurs, current flows through coil 113, energizing the relay 113 and moving the switch arms 114, 115 to the lower position.

In one successful embodiment of the invention, the following component values were used:

| Resistor: | Value, ohms |
|---|---|
| 13 | 100 |
| 22 | 35 |
| 25 | 10k |
| 28 | 4000 |
| 29 | 8000 |
| 30 | 10k |
| 31 | 8000 |
| 33 | 8000 |
| 34 | 3500 |
| 36 | 600 |
| 54 | 50k |
| 56 | 30k |
| 57 | 10k |
| 64 | 700 |
| 65 | 2250 |
| 66 | 9000 |
| 67 | 500 |
| 72 | 125 |
| 77 | 178k |
| 84 | 5000 |
| 85 | 470 |
| 87 | 2250 |
| 112 | 270 |
| 116 | 25 |
| 117 | 100k |
| 120 | 50k |
| 121 | 333k |

| Semiconductor: | Device |
|---|---|
| 15 | 1N748 |
| 23 | 2N332 |
| 24 | 2N332 |
| 26 | 1N483 |
| 35 | 2N656 |
| 45 | 1N483 |
| 46 | 1N483 |
| 47 | 1N483 |
| 48 | 1N483 |
| 49 | 1N483 |
| 50 | 1N483 |
| 51 | 1N483 |
| 52 | 1N483 |
| 61 | 2N336 |
| 62 | 1N483 |
| 75 | 2N332 |
| 78 | 1N716 |
| 79 | 1N483 |
| 80 | 2N120 |
| 81 | 2N656 |
| 82 | 1N716 |
| 83 | 1N483 |
| 111 | 2N1671 |
| 119 | SV918 |

| Capacitor: | | Value |
|---|---|---|
| 14 | mmfd | 360 |
| 16 | mfd | 0.1 |
| 27 | mfd | 0.02 |
| 32 | mfd | 0.1 |
| 41 | mfd | 0.003 |
| 42 | mfd | 0.003 |
| 43 | mfd | 0.003 |
| 44 | mfd | 0.003 |
| 53 | mfd | 0.03 |
| 55 | mfd | 0.03 |
| 86 | mfd | 0.03 |
| 122 | mfd | 100 |

With the foregoing values of components and semiconductor devices, the control was within one percent and was changeable within ten percent.

I claim:

1. A control circuit responsive to a received signal of varying frequency, comprising: means for receiving a signal of varying frequency and for generating pulses of predetermined time duration and magnitude in response to said signal; means, coupled to said receiving and generating means, for adding said pulses per unit of time to develop a control signal having an amplitude proportional to the frequency of said received signals; and means, coupled to receive said control signal, for performing a control function when said received signal has a predetermined frequency.

2. A control circuit responsive to a received signal of varying frequency, comprising: means for receiving a signal of varying frequency and for generating pulses of predetermined time duration and magnitude in response to said signals; means, coupled to said receiving and generating means, for adding said pulses per unit of time to develop a control signal having an amplitude proportional to the frequency of said received signal; means, coupled to receive said control signal, for performing a control function when said received signal has a predetermined frequency; and means coupled to said receiving means and said adding means for preventing actuation of said control means for a predetermined time period.

3. A control circuit responsive to a received signal of varying frequency, comprising: means for receiving a signal of varying frequency and for generating pulses of predetermined time duration and magnitude in response to said signal; means, coupled to said receiving and generating means, for adding said pulses per unit of time to develop a control signal having an amplitude proportional to the frequency of said received signals; means, coupled to receive said control signal, for performing a control function when said received signal is above a predetermined frequency; and means, coupled to said adding means and said control function means, for actuating said control function means when said received signal is below a predetermined frequency.

4. A control circuit responsive to a received signal of varying frequency, comprising: means for receiving a signal of varying frequency and for generating pulses of predetermined time duration and magnitude in response to said signal; means, coupled to said receiving and generating means, for adding said pulses per unit of time to develop a control signal having an amplitude proportional to the frequency of said received signals; means, coupled to receive said control signal, for performing a control function when said received signal is above a predetermined frequency; means, coupled to receive said control signal and coupled to said control function means, for actuating said control function means when said received signal is below a predetermined frequency; and circuit means, coupled to said receiving and generating means and to said adding means, for disabling said control function means for a predetermined time period.

5. A control circuit responsive to a received signal of varying frequency, comprising: an input circuit, including a monostable multivibrator coupled to receive a signal of varying frequency, for generating a plurality of pulses in response to said received signal; a frequency detector circuit, coupled to said input circuit, for developing a control signal from said pulses having an amplitude proportional to the received signal frequency; and circuit means, coupled to receive said control signal, for performing a control function when said control signal has a predetermined amplitude.

6. A control circuit responsive to a received signal of varying frequency comprising: an input circuit, including means for clipping and clamping a signal of varying frequency and for developing an output of predetermined amplitude and polarity, and a monostable multivibrator coupled to said input circuit and actuatable by the output of said input circuit, for developing output pulses; a frequency detector circuit, coupled to receive said pulses, for developing a control signal from said pulses having an amplitude proportional to received signal frequency; and circuit means, coupled to receive said control signals, for performing a control function when said control signal is above a predetermined amplitude.

7. A control circuit responsive to a received signal of varying frequency, comprising: an input circuit including means for clipping and clamping a signal of varying frequency and for developing an output of predetermined amplitude and polarity; a monostable multivibrator, coupled to said input circuit and actuatable by the output of said input circuit, for developing output pulses; an amplifier circuit, coupled to said multivibrator, for amplifying said pulses; a frequency detector circuit coupled to said amplifier, for adding said pulses per unit of time developing a control signal from said pulses having an amplitude proportional to the received signal frequency; first circuit means, coupled to receive said control signal, for performing a control function when said control signal is above a first predetermined amplitude; and second circuit means, coupled to receive said control signals and to said first circuit means, for actuating said first circuit means when said control signal is below a second predetermined amplitude.

8. The control circuit of claim 7 wherein a third circuit means is coupled to said input circuit and to said frequency detector circuit for preventing actuation of said first and second circuit means for a predetermined length of time.

9. A control circuit responsive to a received signal of varying frequency, comprising: an input circuit, including a first semiconductor device, for clipping and clamping a signal of varying frequency and for developing an output of predetermined amplitude and polarity; a monostable multivibrator, including second and third semiconductor devices coupled to said input circuit and actuatable by the output of said input circuit, for developing output signals having a substantially square wave configuration; an amplifier circuit, including a fourth semiconductor device coupled to said multivibrator, for amplifying said output signals; a frequency detector circuit, including a fifth semiconductor device coupled to said amplifier, for developing a control signal from said output signals having an amplitude proportional to the received signal frequency; first circuit means, including a sixth semiconductor device coupled to receive said control signal, for performing a control function when said control signal is above a first predetermined amplitude; and second circuit means, including a seventh semiconductor device coupled to receive said control signal and coupled to said first circuit means, for actuating said first circuit means when said control signal is below a second predetermined amplitude.

10. A control circuit responsive to a received signal of varying frequency, comprising: an input circuit, including means for developing pulse signals of negative polarity and predetermined amplitude from a signal of varying frequency; a monostable multivibrator, coupled to said input circuit and actuatable by said pulse signals, for developing output pulses having a square wave configuration and having a positive amplitude; a frequency detector circuit, coupled to said monostable multivibrator, for developing a control signal from said square wave pulses having a positive amplitude proportional to the received signal frequency; first circuit means, coupled to said detector circuit and including a semiconductor device and a relay in series, said semiconductor device conducting when said received signal is of a predetermined frequency, for performing a control function when said control signal is above a first predetermined amplitude causing said semiconductor device to cease to conduct; and second circuit means, coupled to receive said positive control signals and coupled to said first circuit means, for causing said semiconductor device to cease to conduct when said positive control signal is below a second predetermined amplitude.

11. A control circuit responsive to a received signal of varying frequency, comprising: means for receiving a signal of varying frequency and for generating pulses of predetermined time duration and magnitude in response to said signal; means, coupled to said receiving and generating means, for producing a control signal proportional to the frequency of said received signal; means coupled to receive said control signal for performing a control function when said received signal has a predetermined frequency; and means coupled to said control function means to maintain said function even though the frequency of the received signal decreases.

12. A control circuit as defined in claim 1 and further including means coupled to said control function means for maintaining said function even though the frequency of the received signal decreases.

13. A control circuit as defined in claim 1 wherein said means for performing a control function includes a first semiconductor normally conducting, a second semiconductor responsive to said control signal to place said first semiconductor in a nonconducting state, a resistor connected between said first and second semiconductors to feed back a signal to said second semiconductor to rapidly switch said second semiconductor to a conducting condition, and a diode connected between said first and second semiconductor for maintaining said second semiconductor in a conducting state even though the frequency of the received signal decreases.

14. A control circuit responsive to a received signal of varying frequency, comprising: means for receiving a signal of varying frequency and for generating pulses of predetermined time duration and magnitude in response to said signal; means, coupled to said receiving and generating means, for developing a control signal proportional to the frequency of said received signal; means, coupled to receive said control signal, for performing a control function when said received signal is above a predetermined frequency; and means, coupled to said control signal developing means and said control function means, for actuating said control function means when said received signal is below a predetermined frequency.

15. A control circuit as defined in claim 13 wherein said means for performing a control function includes a first semiconductor which conducts above said predetermined frequency, and said means for actuating said control function means includes a second semiconductor connected to said first semiconductor for causing said first semiconductor to conduct when said received signal is below said predetermined frequency.

References Cited by the Examiner

UNITED STATES PATENTS 2,858,426    10/58    Meserve et al. _____ 328—59 X

OTHER REFERENCES

Carter: IBM Technical Disclosure Bulletin, vol. 1, No. 6, April 1959.

JOHN W. HUCKERT, *Primary Examiner.*

ARTHUR GAUSS, *Examiner.*